US011996064B2

(12) United States Patent
Higuchi

(10) Patent No.: US 11,996,064 B2
(45) Date of Patent: *May 28, 2024

(54) DISPLAY DRIVE DEVICE, REFERENCE GAMMA VOLTAGE SUPPLY DEVICE, AND DISPLAY DEVICE

(71) Applicant: LAPIS Technology Co., Ltd., Yokohama (JP)

(72) Inventor: Koji Higuchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,676

(22) Filed: Mar. 22, 2023

(65) Prior Publication Data

US 2023/0317030 A1 Oct. 5, 2023

(30) Foreign Application Priority Data

Mar. 31, 2022 (JP) ................................ 2022-059798

(51) Int. Cl.
*G09G 3/36* (2006.01)

(52) U.S. Cl.
CPC ......... *G09G 3/3696* (2013.01); *G09G 3/3688* (2013.01); *G09G 2310/027* (2013.01); *G09G 2310/0291* (2013.01); *G09G 2320/0233* (2013.01); *G09G 2320/0276* (2013.01); *G09G 2320/0673* (2013.01)

(58) Field of Classification Search
CPC ............... G09G 3/3696; G09G 3/3688; G09G 2310/027; G09G 2310/0291; G09G 2320/0233; G09G 2320/0276; G09G 2320/0673
See application file for complete search history.

(56) References Cited

U.S. PATENT DOCUMENTS 9,035,931 B2 * 5/2015 Seo ...................... G09G 3/3655 345/87
9,135,882 B2 * 9/2015 Zhang .................. G09G 3/3692
9,646,560 B2 * 5/2017 Kim ..................... G09G 3/3688
(Continued)

FOREIGN PATENT DOCUMENTS

JP 2006330292 12/2006

*Primary Examiner* — Michael J Jansen, II
(74) *Attorney, Agent, or Firm* — JCIPRNET

(57) ABSTRACT

A display drive device includes a common voltage generating circuit that applies a voltage obtained by amplifying a reference common voltage to a common electrode as a common voltage, a reference gamma voltage generating circuit generating first to kth reference gamma voltages corresponding to predetermined gamma characteristics, a gamma compensation circuit receiving a voltage of the common electrode from the display panel and generating first to kth compensated reference gamma voltages obtained by adjusting voltage values of the first to kth reference gamma voltages based on a difference between the received voltage of the common electrode and the reference common voltage, and data drivers, each receives the first to kth compensated reference gamma voltages, generates grayscale voltages based on the first to kth compensated reference gamma voltages, selects a grayscale voltage corresponding to a brightness level indicated by a video signal, and supplies the grayscale voltage to each data line.

9 Claims, 8 Drawing Sheets

(56) References Cited

U.S. PATENT DOCUMENTS

| | | | | |
|---|---|---|---|---|
| 11,120,772 | B1 * | 9/2021 | Hsieh | G05F 3/08 |
| 11,430,368 | B2 * | 8/2022 | Oh | G09G 3/3225 |
| 11,670,254 | B2 * | 6/2023 | Higuchi | G09G 3/3648<br>345/87 |
| 2006/0132415 | A1 * | 6/2006 | Yu | G09G 3/3655<br>345/98 |
| 2007/0097107 | A1 * | 5/2007 | Furukoshi | G09G 3/3648<br>345/204 |
| 2009/0128536 | A1 * | 5/2009 | Seo | G09G 3/3655<br>345/87 |
| 2014/0168043 | A1 * | 6/2014 | Zhang | G09G 3/3692<br>345/90 |
| 2015/0356932 | A1 * | 12/2015 | Kim | G09G 3/3688<br>345/690 |
| 2022/0068184 | A1 * | 3/2022 | Oh | G09G 3/3291 |
| 2022/0277705 | A1 * | 9/2022 | Higuchi | G09G 3/3696 |

* cited by examiner

DISPLAY DRIVE DEVICE, REFERENCE GAMMA VOLTAGE SUPPLY DEVICE, AND DISPLAY DEVICE

CROSS-REFERENCE TO RELATED APPLICATION

This application claims the priority benefits of Japanese application no. 2022-059798, filed on Mar. 31, 2022. The entirety of the above-mentioned patent application is hereby incorporated by reference herein and made a part of this specification.

BACKGROUND

Technical Field

The disclosure relates to a display drive device that drives a display panel according to a video signal, a reference gamma voltage supply device, and a display device.

Description of Related Art

Recently, gaming monitors having performance suitable for playing games comfortably have attracted attention as liquid crystal display devices. Gaming monitors display videos at a higher refresh rate than normal monitors to limit display delay and realize smooth motion video display.

Incidentally, video sources which are handled, for example, in PC games and whose image of each frame is generated by real-time drawing are so-called variable frame rate videos in which the time required to draw each frame differs depending on the drawing load at each moment. Thus, if the refresh rate of a monitor that receives such a video source is fixed, an erroneous video will be displayed.

Accordingly, gaming monitors with a variable refresh rate synchronization function that can dynamically change the refresh rate to follow a video source with a variable frame rate have now become mainstream.

However, when the refresh rate of the gaming monitor dynamically changes, the overall brightness of the screen changes due to a change in gamma characteristics associated with the change in the refresh rate, causing a problem that flicker is seen.

Thus, a liquid crystal display device in which a refresh rate is detected, a gamma value of video optimal for the detected refresh rate is read from a memory, and the read gamma value is used to change the gamma characteristics to limit flicker has been proposed (see, for example, Patent Document 1: Japanese Patent Laid-Open No. 2006-330292). In the liquid crystal display device, a timing controller included therein receives an enable signal and a clock signal indicating a display timing together with display data and detects a refresh rate based on the enable and clock signals.

Incidentally, the liquid crystal display device described in Patent Document 1 measures the frame length (time) of each frame to determine whether the refresh rate has changed. Thus, the gamma value is changed after the refresh rate of each frame is measured and therefore the timing of changing the gamma value is delayed by at least one frame. Thus, there is a problem that such a method cannot prevent flicker.

In addition, as the display panel of the liquid crystal display device becomes higher in definition, the circuit size of a driver for driving the display panel increases and thus the circuit size is desired to be reduced.

Therefore, the disclosure provides a display drive device, a reference gamma voltage supplying device, and a display device capable of limiting an increase in circuit size and limiting the occurrence of flicker.

SUMMARY

A display drive device according to an embodiment is a display drive device for driving a display panel including a plurality of data lines to which a plurality of display cells are connected and a common electrode commonly connected to the plurality of display cells according to a video signal, the display drive device including a common voltage generating circuit configured to receive a reference common voltage and apply a voltage obtained by amplifying the reference common voltage to the common electrode as a common voltage, a reference gamma voltage generating circuit configured to generate first to kth reference gamma voltages corresponding to predetermined gamma characteristics, where k is an integer of 2 or more, a gamma compensation circuit configured to receive a voltage of the common electrode from the display panel and generate first to kth compensated reference gamma voltages obtained by adjusting voltage values of the first to kth reference gamma voltages based on a comparison result between the received voltage of the common electrode and the reference common voltage, and at least one data driver, each being configured to receive the first to kth compensated reference gamma voltages, generate a plurality of grayscale voltages based on the first to kth compensated reference gamma voltages, and supply a grayscale voltage corresponding to a brightness level indicated by the video signal among the plurality of grayscale voltages to the data lines.

A reference gamma voltage supply device according to an embodiment includes a reference gamma voltage generating circuit configured to generate first to kth reference gamma voltages, where k is an integer of 2 or more, corresponding to gamma characteristics of a display panel including a plurality of data lines to which a plurality of display cells are connected and a common electrode commonly connected to the plurality of display cells, and a gamma compensation circuit configured to receive a voltage of the common electrode from the display panel and generate first to kth compensated reference gamma voltages obtained by adjusting voltage values of the first to kth reference gamma voltages based on a comparison result between the received voltage of the common electrode and a predetermined reference common voltage, wherein the gamma compensation circuit is configured to supply the first to kth compensated reference gamma voltages to at least one data driver, each being configured to generate a plurality of grayscale voltages based on the first to kth compensated reference gamma voltages and supply a grayscale voltage corresponding to a brightness level indicated by an input video signal among the plurality of grayscale voltages to the data lines.

A display device according to an embodiment includes a display panel including a plurality of data lines to which a plurality of display cells are connected and a common electrode commonly connected to the plurality of display cells, a common voltage generating circuit configured to receive a reference common voltage and apply a voltage obtained by amplifying the reference common voltage to the common electrode as a common voltage, a reference gamma voltage generating circuit configured to generate first to kth reference gamma voltages corresponding to gamma characteristics of the display panel, where k is an integer of 2 or more, a gamma compensation circuit configured to receive a voltage of the common electrode from the display panel and generate first to kth compensated reference gamma voltages obtained by adjusting voltage values of the first to kth reference gamma voltages based on a comparison result between the received voltage of the common electrode and the reference common voltage, and at least one data driver, each being configured to receive the first to kth compensated reference gamma voltages, generate a plurality of grayscale voltages based on the first to kth compensated reference gamma voltages, and supply a grayscale voltage corresponding to a brightness level indicated by an input video signal among the plurality of grayscale voltages to the data lines.

DESCRIPTION OF THE EMBODIMENTS

In the disclosure, the compensated reference gamma voltages in which a voltage change of the common electrode of the display panel has been compensated for, rather than reference gamma voltages corresponding to gamma characteristics of the display panel, are supplied to each of the plurality of data drivers configured to generate a plurality of grayscale voltages based on the reference gamma voltages and supply a grayscale voltage corresponding to a brightness level indicated by an input video signal among the plurality of grayscale voltages to the display panel.

That is, the gamma compensation circuit that receives the voltage of the common electrode of the display panel and generates a compensated reference gamma voltage by adjusting the voltage value of a reference gamma voltage based on the difference between the voltage of the common electrode and the reference common voltage is provided outside the data driver. If the voltage of the common electrode of the display panel changes due to a change in the refresh rate or the like, the gamma compensation circuit generates a plurality of grayscale voltages based on the compensated reference gamma voltage whose voltage value has changed following the voltage change. Accordingly, even after the refresh rate changes, it is possible to maintain the display brightness from before the change and therefore it is possible to limit the occurrence of flicker. Further, the gamma compensation circuit is provided outside the data driver, preventing an increase in the circuit size of each data driver.

Thus, according to the disclosure, it is possible to limit an increase in circuit size and limit the occurrence of flicker.

Hereinafter, embodiments of the disclosure will be described in detail with reference to the drawings.

Figure 1:
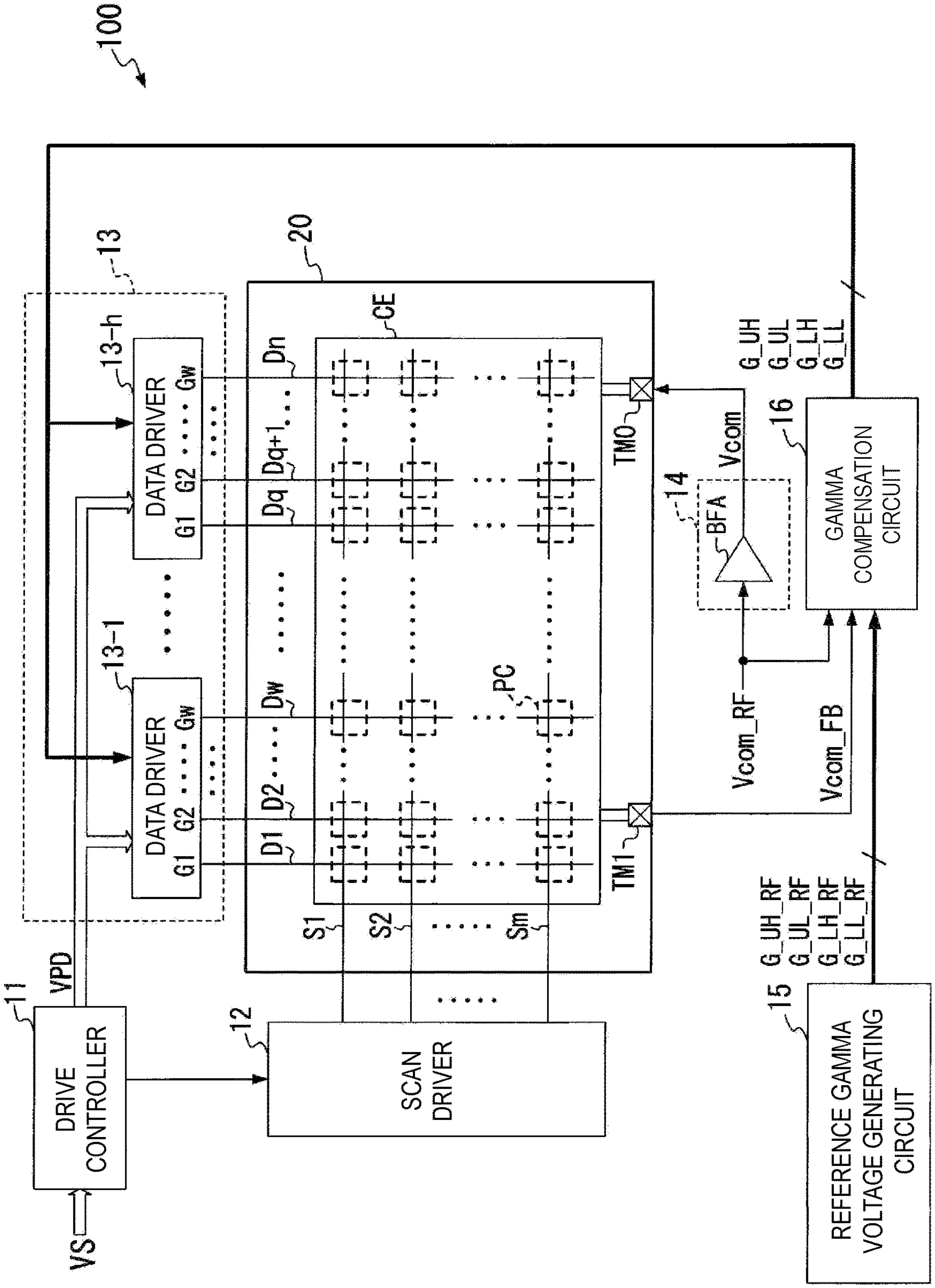
FIG. 1 is a block diagram showing a configuration of a display device 100 including a display drive device according to the disclosure.

FIG. 1 is a block diagram showing a configuration of a display device 100 according to the disclosure.

The display device 100 is, for example, a liquid crystal display device with a variable refresh rate synchronization function.

As shown in FIG. 1, the display device 100 includes a drive controller 11, a scan driver 12, a data driver 13, a common voltage generator 14, a reference gamma voltage generating circuit 15, a gamma compensation circuit 16, and a display panel 20.

The drive controller 11, the scan driver 12, the data driver 13, the common voltage generator 14, the reference gamma voltage generating circuit 15, and the gamma compensation circuit 16 are formed on individual semiconductor IC chips. Thus, in the display device 100, the plurality of semiconductor IC chips on which the drive controller 11, the scan driver 12, the data driver 13, the common voltage generator 14, the reference gamma voltage generating circuit 15, and the gamma compensation circuit 16 are individually formed are disposed on a substrate of the display panel 20 or on a substrate other than the substrate of the display panel 20. Here, the gamma compensation circuit 16 may be formed on the semiconductor IC chip on which the reference gamma voltage generating circuit 15 is formed or on the semiconductor IC chip on which the common voltage generator 14 is formed.

Scan lines S1 to Sm (where m is an integer of 2 or more), each extending in a horizontal direction of a two-dimensional screen, and data lines D1 to Dn (where n is an integer of 2 or more), each extending in a vertical direction of the two-dimensional screen, are arranged intersecting each other on the display panel 20. Display cells PC which are, for example, liquid crystal display elements are formed at the intersections of the scan lines and the data lines. Further, the display panel 20 is provided with a plate-shaped common electrode CE, a terminal TM0 for inputting a common voltage to the common electrode CE, and a terminal TM1 for extracting the voltage of the common electrode CE.

Figure 2:
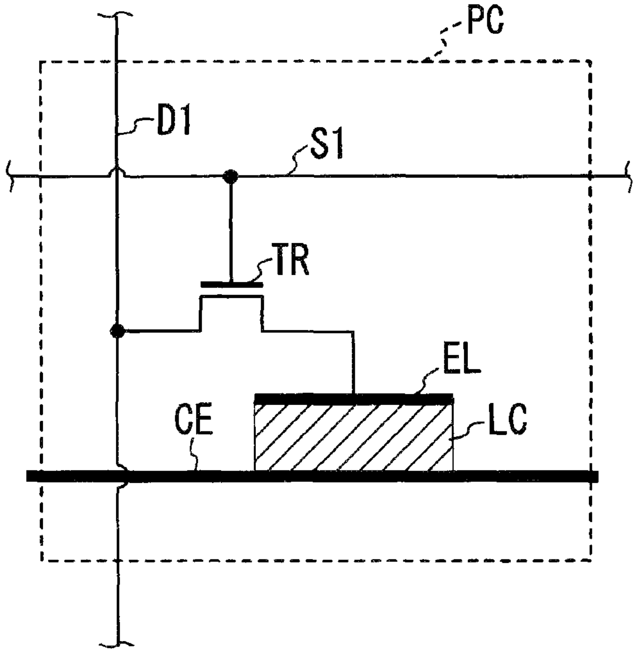
FIG. 2 is a circuit diagram showing an example of an equivalent circuit of a display cell PC.

FIG. 2 is a circuit diagram showing an example of an equivalent circuit of a display cell PC formed at the intersection of a data line D1 and a scan line S1 selected from the display cells PC.

As shown in FIG. 2, the display cell PC includes a pixel electrode EL and a liquid crystal layer LC, stacked on the common electrode CE, and a MOS thin film transistor TR which is a pixel switch. The pixel electrode EL is a transparent electrode provided separately for each display cell PC and the common electrode CE is a single transparent electrode formed corresponding to the forming area of all display cells PC of the display panel 20. A gate of the thin film transistor TR is connected to the scan line S1 and a source of the thin film transistor TR is connected to the data line D1. Further, a drain of the thin film transistor TR is connected to the pixel electrode EL.

In FIG. 1, the drive controller 11 receives a video signal VS, detects a horizontal synchronization signal from the video signal VS, and supplies the horizontal synchronization signal to the scan driver 12. Further, based on the video signal VS, the drive controller 11 generates an image data signal VPD including a series of pieces of display data, each representing the brightness level of a corresponding display cell PC, for example, in an 8-bit gray scale and outputs the image data signal VPD to the data driver 13. The drive controller 11 adjusts the length of a vertical blanking period in each frame in the image data signal VPD to follow the frequency of a vertical synchronization signal of the video signal VS.

The scan driver 12 sequentially and selectively applies a selection signal including a selection pulse to each of the scan lines S1 to Sm according to the horizontal synchronization signal.

For each n pieces of display data corresponding to one horizontal scan in the series of pieces of display data included in the image data signal VPD, the data driver 13 converts each piece of display data to a grayscale voltage having a voltage value corresponding to a corresponding brightness level. Then, the data driver 13 generates n drive voltages G1 to Gn by individually amplifying the grayscale voltages corresponding to the n pieces of display data and applies the n drive voltages G1 to Gn respectively to the data lines D1 to Dn of the display panel 20.

The common voltage generator 14 includes an amplifier BFA that receives a reference common voltage Vcom_RF and amplifies the reference common voltage Vcom_RF.

The amplifier BFA amplifies the reference common voltage Vcom_RF, for example, with a gain of 1 to generate an intermediate voltage in a range of voltages that can be taken as the grayscale voltage, that is, a voltage at the boundary between positive voltage values and negative voltage values, as a common voltage Vcom. The common voltage generator 14 supplies the common voltage Vcom to the terminal TM0 of the display panel 20. Thus, the common voltage Vcom is applied to the liquid crystal layer LC included in all display cells PC formed in the display panel 20 through the common electrode CE.

The reference gamma voltage generating circuit 15 generates a reference gamma voltage G_UH_RF and a reference gamma voltage G_UL_RF that are higher than the reference common voltage Vcom_RF and have voltage values corresponding to gamma characteristics of the display panel 20. The reference gamma voltage G_UH_RF is higher than the reference gamma voltage G_UL_RF.

Further, the reference gamma voltage generating circuit 15 generates a reference gamma voltage G_LH_RF and a reference gamma voltage G_LL_RF that are lower than the reference common voltage Vcom_RF and have voltage values corresponding to gamma characteristics of the display panel 20. The reference gamma voltage G_LH_RF is higher than the reference gamma voltage G_LL_RF.

That is, the reference gamma voltage generating circuit 15 generates the four reference gamma voltages having a magnitude relationship of G_UH_RF>G_UL_RF>Vcom_RF>G_LH_RF>G_LL_RF.

Hereafter, the reference gamma voltages G_UH_RF and G_UL_RF which are higher than the reference common voltage Vcom_RF are treated as positive voltages and the reference gamma voltages G_LH_RF and G_LL_RF which are lower than the reference common voltage Vcom_RF are treated as negative voltages.

The reference gamma voltage generating circuit 15 supplies the reference gamma voltages G_UH_RF, G_UL_RF, G_LH_RF, and G_LL_RF to the gamma compensation circuit 16.

The gamma compensation circuit 16 receives the reference gamma voltages G_UH_RF, G_UL_RF, G_LH_RF, and G_LL_RF and the reference common voltage Vcom_RF and receives the voltage of the common electrode CE from the terminal TM1 of the display panel 20 as a feedback common voltage Vcom_FB.

The gamma compensation circuit 16 adjusts the voltage values of the reference gamma voltages G_UH_RF, G_UL_RF, G_LH_RF, and G_LL_RF based on a comparison result between the feedback common voltage Vcom_FB and the reference common voltage Vcom_RF, that is, a difference between Vcom_FB and Vcom_RF. As a result, the gamma compensation circuit 16 generates the reference gamma voltages G_UH_RF, G_UL_RF, G_LH_RF, and G_LL_RF compensated for the change in the common voltage Vcom as compensated reference gamma voltages G_UH, G_UL, G_LH, and G_LL.

The gamma compensation circuit 16 supplies the generated compensated reference gamma voltages G_UH, G_UL, G_LH, and G_LL to the data driver 13.

The data driver 13 includes h data drivers 13_1 to 13_h (where h is an integer of 2 or more). The data drivers 13_1 to 13_h are formed on individual semiconductor IC chips.

The data drivers 13_1 to 13_h are provided corresponding to data line groups of w adjacent data lines (where w is an integer of 2 or more) into which the data lines D1 to Dn of the display panel 20 are divided. For example, the data driver 13_1 supplies corresponding drive voltages to the w data lines D1 to Dw out of the data lines D1 to Dn. The data driver 13_h supplies corresponding drive voltages to the w data lines Dq to Dn (where q is an integer of 2 or more) out of the data lines D1 to Dn.

The data drivers 13_1 to 13_h have the same internal configuration and each individually receives the image data signal VPD supplied from the drive controller 11 and the compensated reference gamma voltages G_UH, G_UL, G_LH, and G_LL supplied from the gamma compensation circuit 16.

Figure 3:
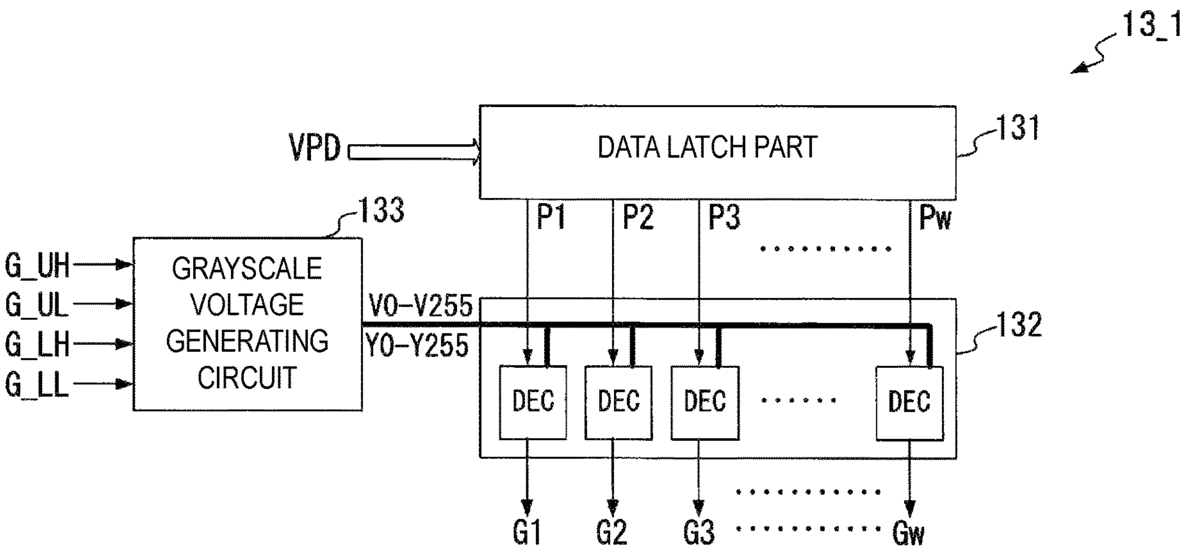
FIG. 3 is a block diagram showing an internal configuration of a data driver 13_1.

FIG. 3 is a block diagram schematically showing the internal configuration of the data driver 13_1 selected from the data drivers 13_1 to 13_h.

As shown in FIG. 3, the data driver 13_1 includes a data latch part 131, a DA converter 132, and a grayscale voltage generating circuit 133.

The data latch part 131 receives w pieces of display data corresponding to the data driver 13_1 from the series of pieces of display data included in the image data signal VPD and supplies the w pieces of display data to the DA converter 132 as pieces of display data P1 to Pw.

The grayscale voltage generating circuit 133 generates a group of 256 positive voltages that are higher than the common voltage Vcom and have different voltage values and a group of 256 negative voltages that are lower than the common voltage Vcom and have different voltage values based on the compensated reference gamma voltages G_UH, G_UL, G_LH, and G_LL.

Figure 4:
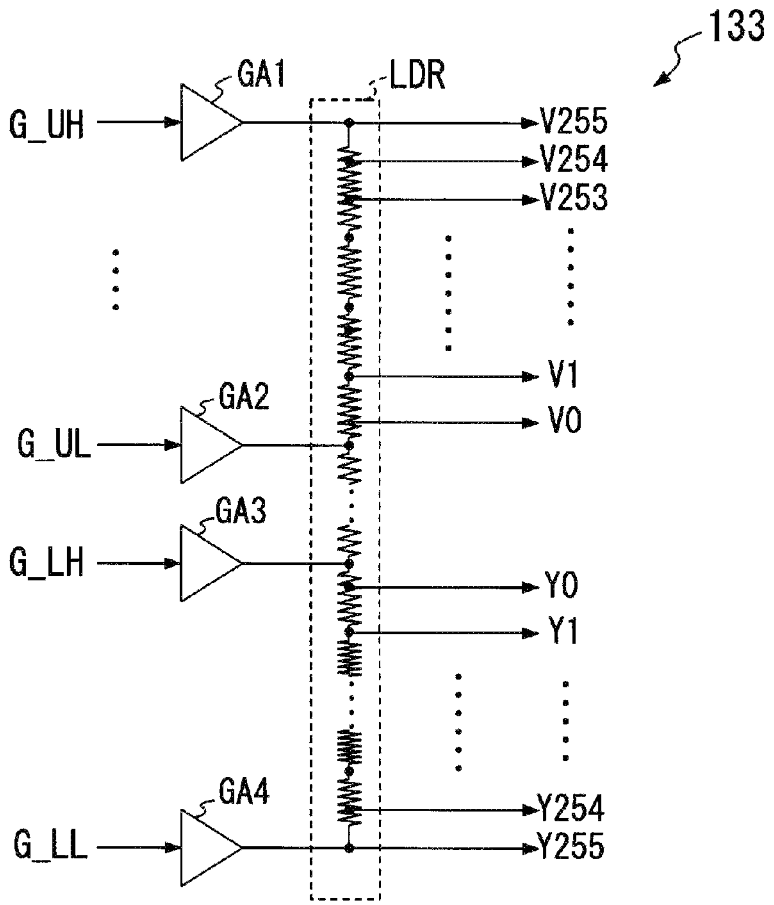
FIG. 4 is a block diagram showing an example of an internal configuration of a grayscale voltage generating circuit 133.

FIG. 4 is a circuit diagram showing an example of a configuration of the grayscale voltage generating circuit 133.

As shown in FIG. 4, the grayscale voltage generating circuit 133 includes gamma amplifiers GA1 to GA4 and a ladder resistor LDR.

The gamma amplifier GA1 receives the compensated reference gamma voltage G_UH and applies a voltage obtained by amplifying the compensated reference gamma voltage G_UH, for example, with a gain of 1 to one end of the ladder resistor LDR. The gamma amplifier GA4 receives the compensated reference gamma voltage G_LL and applies a voltage obtained by amplifying the compensated reference gamma voltage G_LL, for example, with a gain of 1 to the other end of the ladder resistor LDR. The gamma amplifier GA2 receives the compensated reference gamma voltage G_UL and applies a voltage obtained by amplifying the compensated reference gamma voltage G_UL, for example, with a gain of 1 to a resistor connection point of the ladder resistor LDR which is closer to the one end than a central connection point is. The gamma amplifier GA3 receives the compensated reference gamma voltage G_LH and applies a voltage obtained by amplifying the compensated reference gamma voltage G_LH, for example, with a gain of 1 to a resistor connection point of the ladder resistor LDR which is closer to the other end than the central connection point is.

The ladder resistor LDR includes a resistor group consisting of a plurality of resistors connected in series, receives the compensated reference gamma voltages G_UH, G_UL, G_LH, and G_LL, and outputs voltages generated at 512 resistor connection points as grayscale voltages V0 to V255 and Y0 to Y255. That is, the ladder resistor LDR divides the voltage between the compensated reference gamma voltages G_UH and G_UL to generate grayscale voltages V0 to V255 as a group of positive grayscale voltages. Further, the ladder resistor LDR divides the voltage between the compensated reference gamma voltages G_LH and G_LL to generate grayscale voltages Y0 to Y255 as a group of negative grayscale voltages.

With this configuration, the grayscale voltage generating circuit 133 supplies the positive grayscale voltages V0 to V255 and the negative grayscale voltages Y0 to Y255, which have voltage values corresponding to gamma characteristics of the display panel 20, to the DA converter 132.

The DA converter 132 includes w decoders (DEC). The decoders (DEC) are provided corresponding to the pieces of display data P1 to Pw and receive the grayscale voltages V0-V255 and Y0-Y255. Each decoder selects one grayscale voltage corresponding to a brightness level indicated by a piece of display data P that it has received from among the grayscale voltages V0 to V255 and Y0 to Y255 and applies a voltage obtained by amplifying the selected grayscale voltage to a corresponding data line D of the display panel 20 as a drive voltage. That is, the DA converter 132 applies w drive voltages generated based on the pieces of display data P1 to Pw to w data lines D of the display panel 20 as drive voltages G1 to Gw.

Next, an operation of the gamma compensation circuit 16 shown in FIG. 1 will be described in detail.

Figure 5:
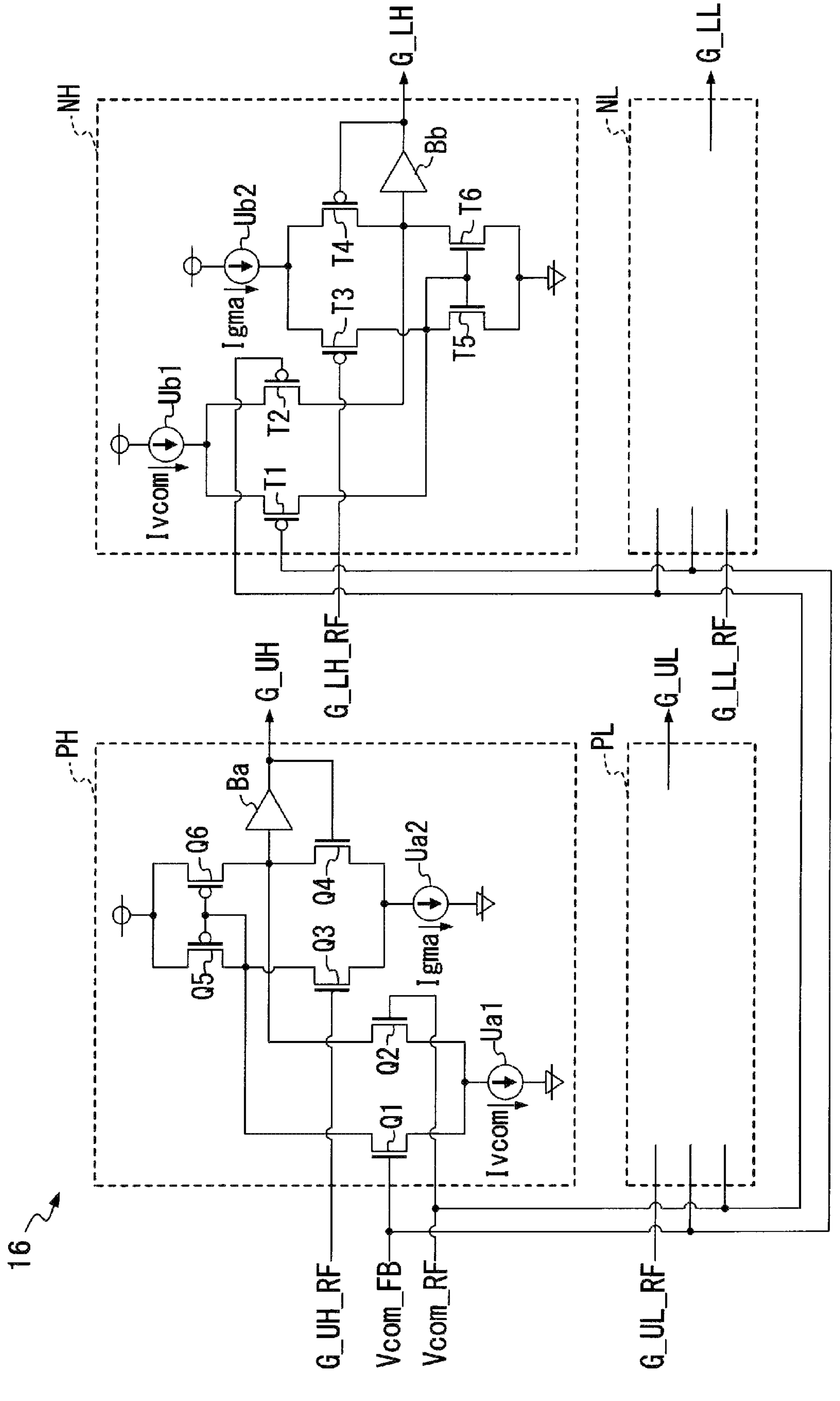
FIG. 5 is a circuit diagram showing an example of an internal configuration of a gamma compensation circuit 16.

FIG. 5 is a circuit diagram showing an example of an internal configuration of the gamma compensation circuit 16.

The gamma compensation circuit 16 includes positive gamma compensation circuits PH and PL and negative gamma compensation circuits NH and NL.

As shown in FIG. 5, the positive gamma compensation circuit PH includes N-channel metal oxide semiconductor (MOS) transistors Q1 and Q2 that constitute a first differential stage (also referred to as a Vcom differential stage) and N-channel MOS transistors Q3 and Q4 that constitute a second differential stage (also referred to as a GMA differential stage). The positive gamma compensation circuit PH also includes P-channel MOS transistors Q5 and Q6 that constitute a current mirror circuit as loads of the Vcom differential stage and the GMA differential stage. Further, the positive gamma compensation circuit PH includes a current source Ua1 that supplies a constant current Ivcom, a current source Ua2 that supplies a constant current Igma, and an amplifier Ba.

A high potential terminal of the current source Ua1 is connected to sources of the transistors Q1 and Q2. A negative power supply voltage having a voltage value equal to or lower than the reference gamma voltage G_LH_RF is applied to a low potential terminal of the current source Ua1. The feedback common voltage Vcom_FB is supplied to a gate of the transistor Q1 and a drain of the transistor Q1 is connected to drains of the transistors Q3 and Q5 and gates of the transistors Q5 and Q6 through a node n1. The reference common voltage Vcom_RF is supplied to a gate of the transistor Q2 and a drain of the transistor Q2 is connected to drains of the transistors Q4 and Q6 and an input terminal of the amplifier Ba through a node n2.

With the above configuration, the Vcom differential stage (Q1, Q2) passes two currents, into which the constant current Ivcom is divided in the ratio of the magnitudes of the feedback common voltage Vcom_FB and the reference common voltage Vcom_RF, respectively to the nodes n1 and n2.

A high potential terminal of the current source Ua2 is connected to sources of the transistors Q3 and Q4. The negative power supply voltage described above is applied to a low potential terminal of the current source Ua2. The reference gamma voltage G_UH_RF is supplied to a gate of the transistor Q3. A gate of the transistor Q4 is connected to an output terminal of the amplifier Ba. A positive power supply voltage having a voltage value equal to or higher than the reference gamma voltage G_UH_RF is applied to sources of the transistors Q5 and Q6. The amplifier Ba outputs a voltage obtained by amplifying a voltage generated at the node n2 which is a connection point between transistors Q6 and Q4 as a compensated reference gamma voltage G_UH.

With the above configuration, the GMA differential stage (Q3, Q4) passes two currents, into which the constant current Igma is divided in the ratio of the magnitudes of the reference gamma voltage G_UH_RF and the compensated reference gamma voltage G_UH and supplies the currents, respectively to the nodes n1 and n2.

The positive gamma compensation circuit PL has the same circuit configuration as the positive gamma compensation circuit PH described above. Thus, a detailed circuit diagram of the positive gamma compensation circuit PL is omitted in FIG. 5. However, in the positive gamma compensation circuit PL, the gate of the transistor Q3 receives the reference gamma voltage G_UL_RF and the amplifier Ba outputs and supplies the compensated reference gamma voltage G_UL to the gate of the transistor Q4.

As shown in FIG. 5, the negative gamma compensation circuit NH includes P-channel MOS transistors T1 and T2 that constitute a first differential stage (also referred to as a Vcom differential stage) and P-channel MOS transistors T3 and T4 that constitute a second differential stage (also referred to as a GMA differential stage). The negative gamma compensation circuit NH also includes N-channel MOS transistors T5 and T6 that constitute a current mirror circuit as loads of the Vcom differential stage and the GMA differential stage. Further, the negative gamma compensation circuit NH includes a current source Ub1 that supplies a constant current Ivcom, a current source Ub2 that supplies a constant current Igma, and an amplifier Bb.

A low potential terminal of the current source Ub1 is connected to sources of the transistors T1 and T2. The positive power supply voltage described above is applied to a high potential terminal of the current source Ub1. The feedback common voltage Vcom_FB is supplied to a gate of the transistor T1 and a drain of the transistor T1 is connected to drains of the transistors T3 and T5 and gates of the transistors T5 and T6 through a node nd1. The reference common voltage Vcom_RF is supplied to the gate of the transistor T2 and a drain of the transistor T2 is connected to drains of the transistors T4 and T6 and an input terminal of the amplifier Bb through the node nd2.

With the above configuration, the Vcom differential stage (T1, T2) passes two currents, into which the constant current Ivcom is divided in the ratio of the magnitudes of the feedback common voltage Vcom_FB and the reference common voltage Vcom_RF, respectively to the nodes nd1 and nd2.

A low potential terminal of the current source Ub2 is connected to sources of the transistors T3 and T4. The positive power supply voltage described above is applied to a high potential terminal of the current source Ub2. The reference gamma voltage G_LH_RF is supplied to a gate of the transistor T3. A gate of the transistor T4 is connected to an output terminal of the amplifier Bb. The negative power supply voltage described above is applied to sources of the transistors T5 and T6. The amplifier Bb outputs a voltage obtained by amplifying a voltage generated at a connection point between the transistor T6 and the transistor T4 as a compensated reference gamma voltage G_LH.

With the above configuration, the GMA differential stage (T3, T4) passes two currents, into which the constant current Igma is divided in the ratio of the magnitudes of the reference gamma voltage G_LH_RF and the compensated reference gamma voltage G_LH, respectively to the nodes nd1 and nd2.

The negative gamma compensation circuit NL has the same circuit configuration as the negative gamma compensation circuit NH described above. Thus, a detailed circuit diagram of the negative gamma compensation circuit NL is omitted in FIG. 5. However, in the negative gamma compensation circuit NL, the gate of the transistor T3 receives the reference gamma voltage G_LL_RF and the amplifier Bb outputs and supplies the compensated reference gamma voltage G_LL to the gate of the transistor T4.

Detailed operations of the positive gamma compensation circuits PH and PL and the negative gamma compensation circuits NH and NL shown in FIG. 5 will be described below.

When noise is not mixed in the voltage on the common electrode CE of the display panel 20, that is, the common voltage Vcom, the reference common voltage Vcom_RF is as follows:

Vcom_RF=Vcom_FB, and the Vcom differential stage (Q1, Q2, T1, T2) of each of the positive gamma compensation circuits PH and PL and the negative gamma compensation circuits NH and NL outputs currents of (½)·Ivcom. Thus, the GMA differential stage (Q3, Q4, T3, T4) of each of the positive gamma compensation circuits PH and PL and the negative gamma compensation circuits NH and NL equally divides the constant current Igma. As a result, currents of (½)·Ivcom+(½)·Igma flow into the current mirror circuit (Q5, Q6, T5, T6) of each of the positive gamma compensation circuits PH and PL and the negative gamma compensation circuits NH and NL. Thus, G_UH/G_UL becomes equal to G_UH_RF/G_UL_RF.

On the other hand, when noise ΔV is mixed in the common voltage Vcom and thus the feedback common voltage Vcom_FB is such that Vcom_FB=Vcom_RF+ΔV, the currents flowing through the Vcom differential stage are as follows:

(½)·Ivcom+(½)·ΔV·Gmq1 on the Vcom_FB side, and
(½)·Ivcom−(½)·ΔV·Gmq2 on the Vcom_RF side,
where Gmq1 is the transconductance of the transistor Q1 and Gmq2 is the transconductance of the transistor Q2.

At this time, the current of the Vcom differential stage and the current of the GMA differential stage are combined and supplied to the current mirror circuit.

Thus, the G_xx RF side of the GMA differential stage (where xx is UH, UL, LH, or LL) operates to compensate for (½)·ΔV·Gmq1 on the Vcom_FB side, such that a current of (½)·Igma−(½)·ΔV·Gmq1 flows through the G_xx RF side of the GMA differential stage. Further, the G_xx side of the GMA differential stage operates to compensate for—(½)·ΔV·Gmq2 on the Vcom_RF side, such that a current of (½)·Igma+(½)·ΔV·Gmq2 flows through the G_xx side of the GMA differential stage. As a result, if Igma is set to obtain the same differential values on the Vcom side and the GMA side, then G_xx=G_xx RF+ΔV and the voltage change of Vcom_FB is added to G_xx as it is.

Accordingly, G_xx−Vcom_FB=(G_xx RF+ΔV)−(Vcom_RF+ΔV)=G_xx RF−Vcom_RF, such that the difference between the compensated reference gamma voltage G_xx and the feedback common voltage Vcom_FB is always constant.

Through the above operation, for the reference gamma voltage G_UH_RF, the positive gamma compensation circuit PH generates a compensated reference gamma voltage G_UH that satisfies the following:

G_UH_RF+Vcom_FB=G_UH+Vcom_RF, and outputs the generated compensated reference gamma voltage G_UH via the amplifier Ba. That is, the positive gamma compensation circuit PH outputs a voltage obtained by adding the difference between the feedback common voltage Vcom_FB and the reference common voltage Vcom_RF to the reference gamma voltage G_UH_RF as the compensated reference gamma voltage G_UH.

For the reference gamma voltage G_UL_RF, the positive gamma compensation circuit PL generates a compensated reference gamma voltage G_UL that satisfies the following:

G_UL_RF+Vcom_FB=G_UL+Vcom_RF, and outputs the generated compensated reference gamma voltage G_UL via the amplifier Ba. That is, the positive gamma compensation circuit PL outputs a voltage obtained by adding the difference between the feedback common voltage Vcom_FB and the reference common voltage Vcom_RF to the reference gamma voltage G_UL_RF as the compensated reference gamma voltage G_UL.

For the reference gamma voltage G_LH_RF, the negative gamma compensation circuit NH generates a compensated reference gamma voltage G_LH that satisfies the following:

G_LH_RF+Vcom_FB=G_LH+Vcom_RF, and outputs the generated compensated reference gamma voltage G_LH via the amplifier Bb. That is, the negative gamma compensation circuit NH outputs a voltage obtained by adding the difference between the feedback common voltage Vcom_FB and the reference common voltage Vcom_RF to the reference gamma voltage G_LH_RF as the compensated reference gamma voltage G_LH.

For the reference gamma voltage G_LL_RF, the negative gamma compensation circuit NL generates a compensated reference gamma voltage G_LL that satisfies the following:

G_LL_RF+Vcom_FB=G_LL+Vcom_RF, and outputs the generated compensated reference gamma voltage G_LL via the amplifier Bb. That is, the negative gamma compensation circuit NL outputs a voltage obtained by adding the difference between the feedback common voltage Vcom_FB and the reference common voltage Vcom_RF to the reference gamma voltage G_LL_RF as the compensated reference gamma voltage G_LL.

As described in detail above, the gamma compensation circuit 16 adds the difference between the feedback common voltage Vcom_FB received from the display panel 20 and the reference common voltage Vcom_RF to the voltage values of the reference gamma voltages G_UH_RF, G_UL_RF, G_LH_RF, and G_LL_RF to adjust the voltage value of each reference gamma voltage. As a result, the gamma compensation circuit 16 generates the reference gamma voltages G_UH_RF, G_UL_RF, G_LH_RF, and G_LL_RF compensated for the change in the common voltage Vcom as compensated reference gamma voltages G_UH, G_UL, G_LH, and G_LL.

Figure 6:
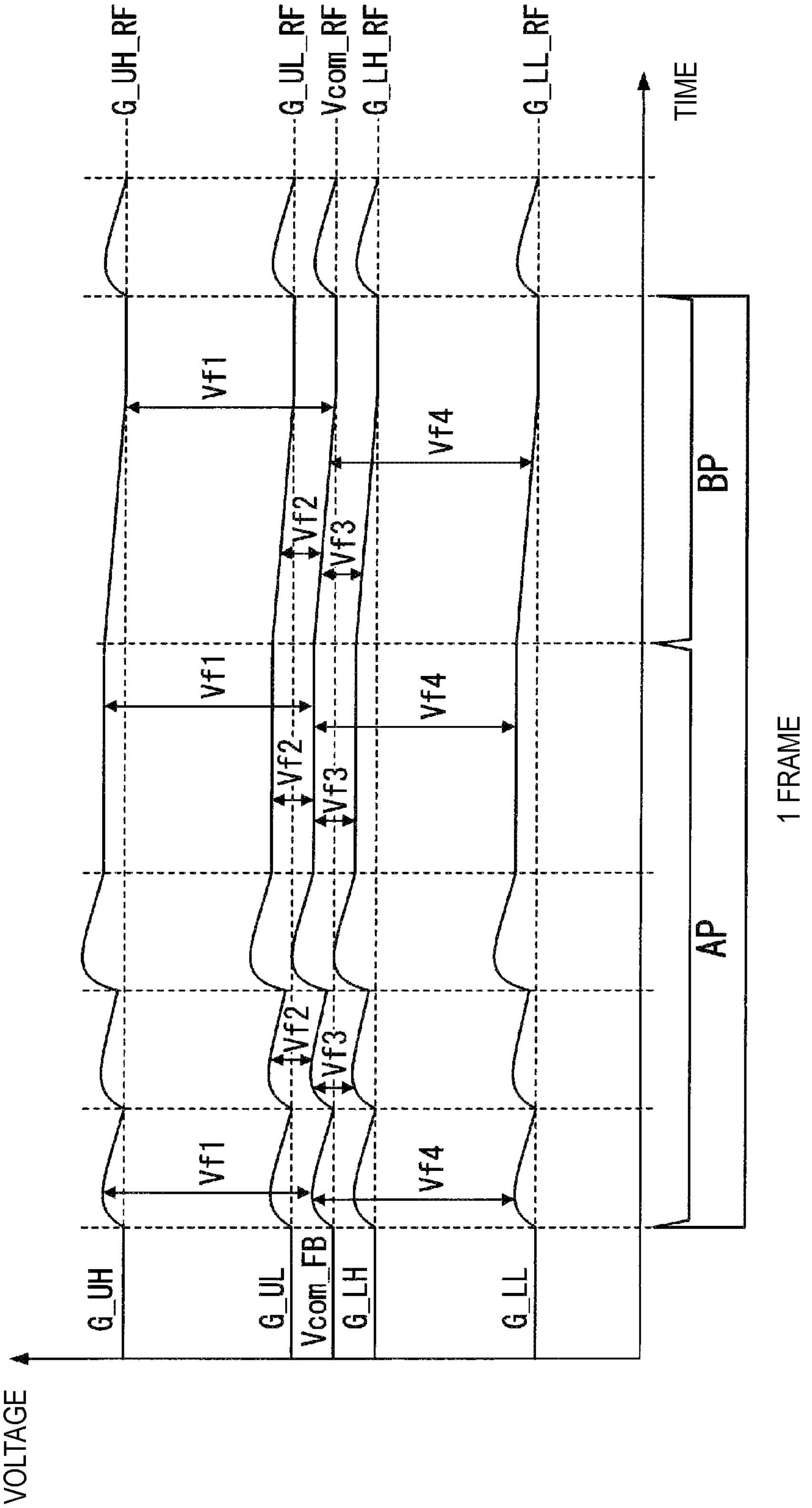
FIG. 6 is a waveform diagram showing changes in voltage values of compensated reference gamma voltages G_UH, G_UL, G_LH, and G_LL in which a change in a common voltage Vcom has been compensated for by the gamma compensation circuit 16.

FIG. 6 is a waveform diagram showing changes in the voltage values of the compensated reference gamma voltages G_UH, G_UL, G_LH, and G_LL in which the voltage change of the feedback common voltage Vcom_FB has been compensated for by the gamma compensation circuit 16. FIG. 6 shows the waveforms of voltages in an active period AP in which the data driver 13 supplies the drive voltages G1 to Gw to the display panel 20 and a vertical blanking period BP in a display period for one selected frame.

With the gamma compensation circuit 16, the difference between the feedback common voltage Vcom_FB and the compensated reference gamma voltage G_UH becomes a constant voltage difference Vf1 over the active period AP and the vertical blanking period BP, regardless of changes in the feedback common voltage Vcom_FB reflecting voltage changes occurring on the common electrode CE of the display panel 20, as shown in FIG. 6. Also, the difference between the feedback common voltage Vcom_FB and the compensated reference gamma voltage G_UL becomes a constant voltage difference Vf2. Also, the difference between the feedback common voltage Vcom_FB and the compensated reference gamma voltage G_LH becomes a constant voltage difference Vf3. Furthermore, the difference between the feedback common voltage Vcom_FB and the compensated reference gamma voltage G_LL becomes a constant voltage difference Vf4. Then, the gamma compensation circuit 16 supplies the compensated reference gamma voltages G_UH, G_UL, G_LH, and G_LL, in which changes in the feedback common voltage Vcom_FB have been compensated for, to the grayscale voltage generating circuit 133 of each of the data drivers 13_1 to 13_h.

That is, a reference gamma voltage supply part including the reference gamma voltage generating circuit 15 and the gamma compensation circuit 16 supplies the compensated reference gamma voltages (G_UH, G_UL, G_LH, G_LL), obtained by compensating the reference gamma voltages (G_UH_RF, G_UL_RF, G_LH_RF, G_LL_RF) corresponding to gamma characteristics of the display panel 20 for changes in the voltage (Vcom_FB) of the common electrode CE, to each of the data drivers 13_1 to 13_h.

A process of limiting a brightness change associated with a change in the refresh rate of the display device 100 by the gamma compensation circuit 16 will be described below.

Figure 7:
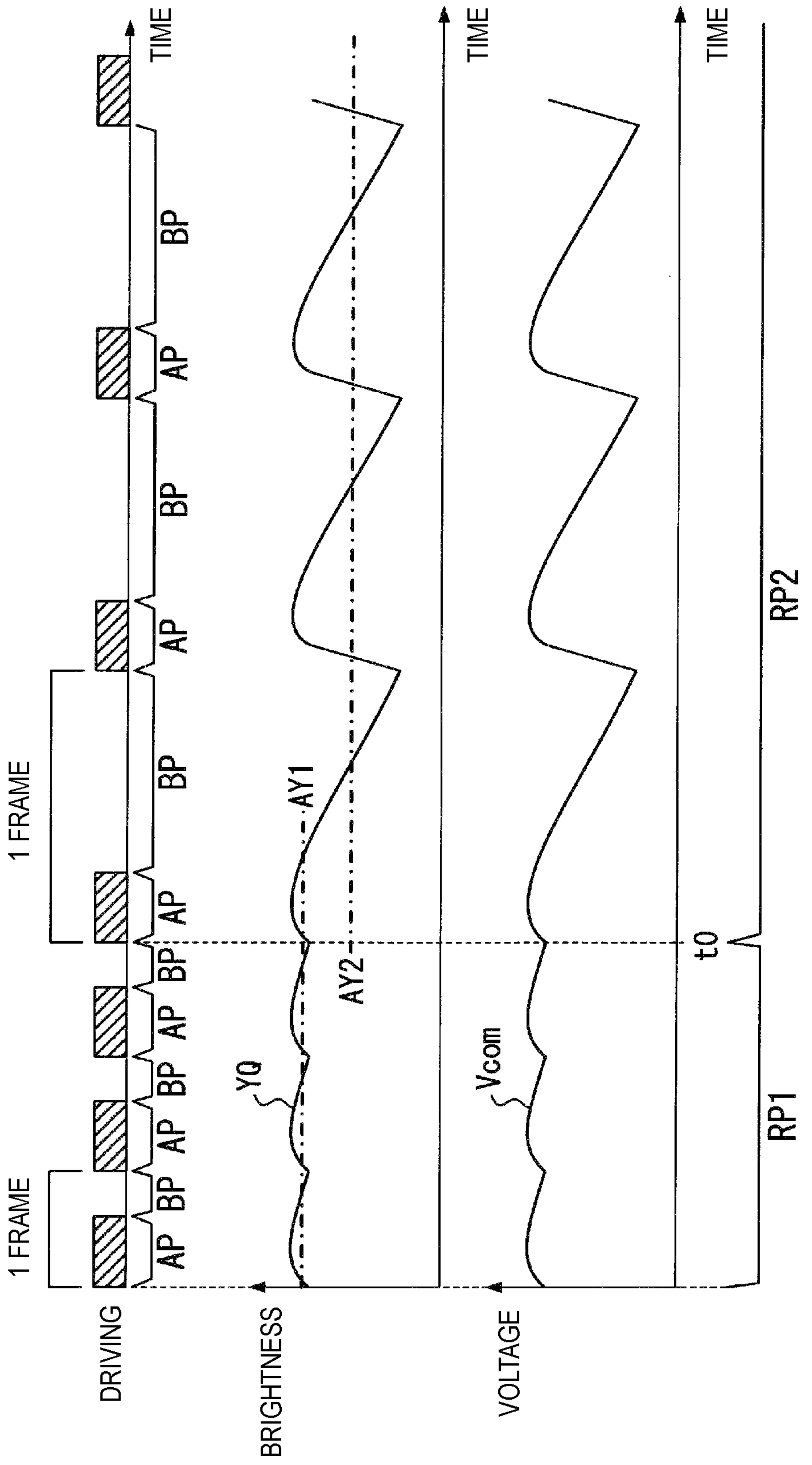
FIG. 7 is a waveform diagram schematically showing an example of the form of changes in the brightness of a displayed image that occur associated with a change in refresh rate.

FIG. 7 is a waveform diagram schematically showing an example of the form of changes in the brightness of a displayed image of a display device of the related art occurring when the refresh rate changes.

In the example shown in FIG. 7, brightness YQ indicates the brightness of the displayed image when the display device of the related art performs display driving with a high-frequency refresh rate (high RF driving RP1) and switches to display driving with a low-frequency refresh rate (low RF driving RP2) at time to.

In FIG. 7, it is assumed that driving for displaying an image with the same brightness is performed during both a period in which the high RF driving RP1 is performed and a period in which the low RF driving RP2 is performed.

With the variable refresh rate synchronization function of the display device, the length of the active period AP in each frame is the same regardless of whether the high RF driving RP1 or the low RF driving RP2 is performed, but the length of the vertical blanking period BP increases as the refresh rate decreases.

Here, since a drive voltage based on an image data signal is not applied to the display panel during the vertical blanking period BP, the voltage value of the common voltage Vcom applied to the common electrode CE of the display panel gradually decreases as time passes as shown in FIG. 7. The vertical blanking period BP during execution of the low RF driving RP2 is longer than the vertical blanking period BP during execution of the high RF driving RP1. Thus, as shown in FIG. 7, the amount of decrease in the common voltage Vcom in the vertical blanking period BP during the low RF driving RP2 is greater than the amount of decrease in the common voltage Vcom in the vertical blanking period BP during the high RF driving RP1.

Accordingly, due to such a change in the common voltage Vcom, a visually perceived brightness AY1 that is visually perceived from the displayed image during the high RF driving RP1 transitions to a visually perceived brightness AY2 upon switching to the low RF driving RP2 as shown in FIG. 7. Thus, it is considered that this is visually perceived as flicker.

Therefore, in the display device 100, the gamma compensation circuit 16 generates the compensated reference gamma voltages G_UH, G_UL, G_LH, and G_LL in which changes in the voltage of the common electrode CE of the display panel 20, that is, the common voltage Vcom, have been compensated for. Then, the grayscale voltage generating circuits 133 of the data drivers 13_1 to 13_h individually generate grayscale voltages V0 to V255 and Y0 to Y255 for the data drivers based on the compensated reference gamma voltages G_UH, G_UL, G_LH, and G_LL.

Accordingly, the difference between each of the compensated reference gamma voltages G_UH, G_UL, G_LH, and G_LL and the feedback common voltage Vcom_FB is always constant as shown in FIG. 6. Thus, the difference between the voltage value of each of the grayscale voltages V0 to V255 and Y0 to Y255 generated based on the compensated reference gamma voltages G_UH, G_UL, G_LH, and G_LL and the feedback common voltage Vcom_FB is also always constant regardless of changes in the feedback common voltage Vcom_FB, unless the image itself represented by the image data signal VPD changes.

Figure 8:
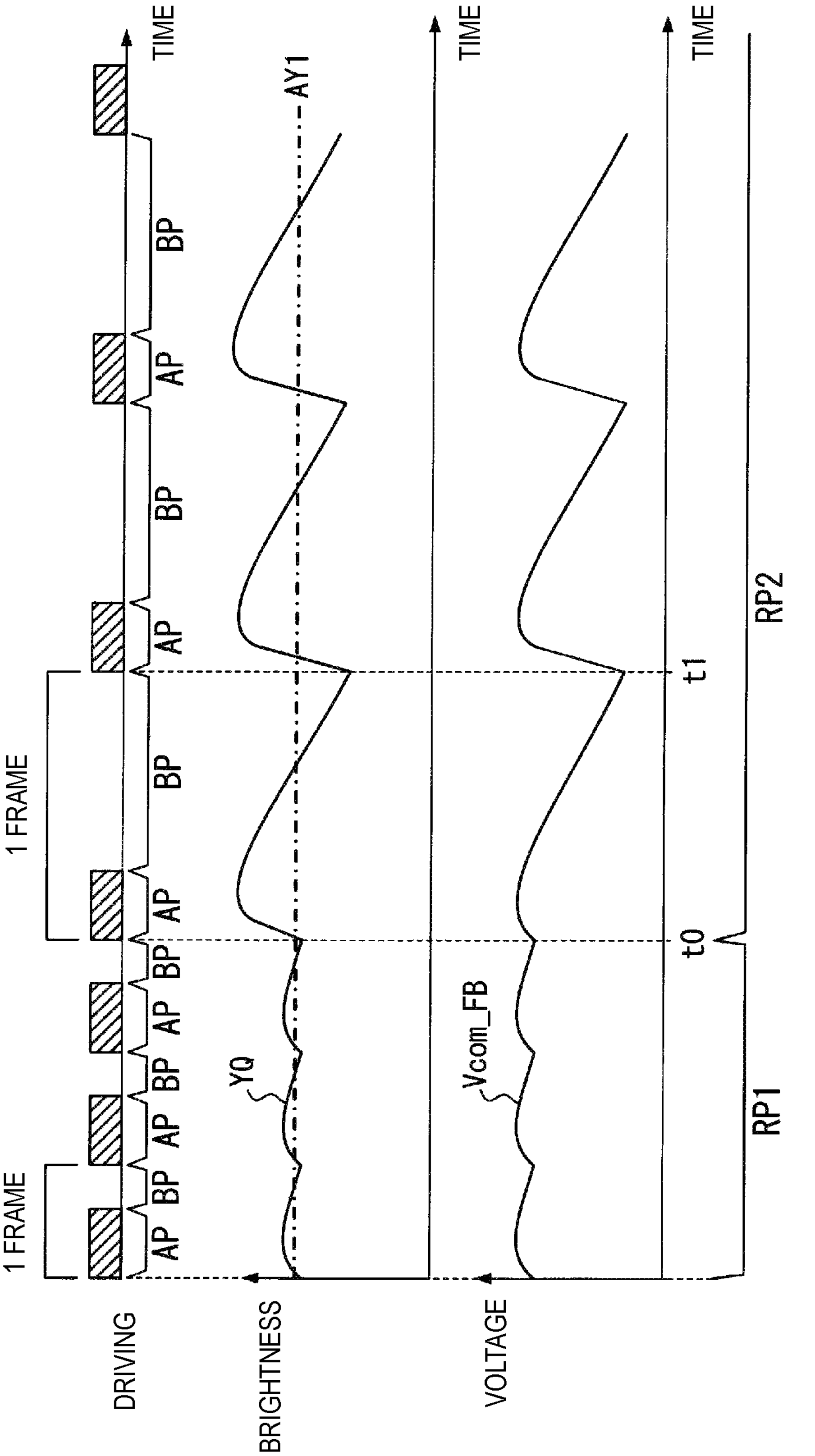
FIG. 8 is a waveform diagram showing an operation of limiting changes in the brightness of a displayed image when the refresh rate changes.

FIG. 8 is a waveform diagram showing how the gamma compensation circuit 16 operates to limit changes in the brightness of a displayed image when the refresh rate changes.

According to the gamma compensation circuit 16, grayscale voltages V0 to V255 and Y0 to Y255 are always generated based on the compensated reference gamma voltages G_UH, G_UL, G_LH, and G_LL in which the change in the common voltage Vcom has been compensated for, regardless of whether the refresh rate has changed.

Thus, according to the gamma compensation circuit 16, even if the voltage (Vcom_FB) of the common electrode CE changes associated with a change in the refresh rate upon switching from the high RF driving RP1 to the low RF driving RP2, the visually perceived brightness AY1 immediately before the switching is maintained before and after a point of time (t0) of the change in the refresh rate. This can quickly limit changes in the visually perceived brightness, that is, flicker, compared to when the adjustment of gamma characteristics is started by detecting the change in the refresh rate at a point of time (t1) after the period of one frame has passed from the point of time (t0) of the change in the refresh rate.

Further, in the display device 100, the gamma compensation circuit 16 is provided outside the data drivers 13_1 to 13_h as shown in FIG. 1, such that the gamma compensation circuit 16 is shared by each of the data drivers 13_1 to 13_h. This prevents an increase in the circuit size of each of the data drivers 13_1 to 13_h.

Thus, according to the disclosure, it is possible to limit an increase in circuit size and limit the occurrence of flicker when the refresh rate changes.

Although, in the above embodiment, the operation of limiting changes in display brightness has been described by taking a change in the common voltage Vcom associated with the change in the refresh rate as an example, it is similarly possible to quickly limit changes in display brightness, for example, when the common voltage Vcom changes upon receiving external noise or the like.

Although, in the above embodiment, four compensated reference gamma voltages (G_UH, G_UL, G_LH, G_LL) are used to generate 512 grayscale voltages (V0 to V256, Y0 to Y255), the numbers of reference gamma voltages and grayscale voltages are not limited to 4 and 256, respectively.

Although FIG. 1 shows a configuration in which the gamma compensation circuit 16 is applied to the display device 100 in which the display panel 20 is driven by a plurality of data drivers (13_1 to 13_h), the gamma compensation circuit 16 may also be provided for a display device in which a display panel 20 is driven by a single data driver. That is, the gamma compensation circuit 16 need only supply the compensation reference gamma voltages (G_UH, G_UL, G_LH, G_LL) generated by the gamma compensation circuit 16 to at least one data driver.

In short, a display drive device according to the disclosure need only include a common voltage generating circuit, a reference gamma voltage generating circuit, a gamma compensation circuit, and at least one data driver that are configured as follows.

That is, the common voltage generator (14) is configured to receive a reference common voltage (Vcom_RF) and apply a voltage obtained by amplifying the reference common voltage (Vcom_RF) to a common electrode (CE) of a display panel (20) as a common voltage (Vcom).

The reference gamma voltage generating circuit (15) is configured to generate first to kth reference gamma voltages (G_UH_RF, G_UL_RF, G_LH_RF, G_LL_RF) corresponding to predetermined gamma characteristics (where k is an integer of 2 or more).

The gamma compensation circuit (16) is configured to receive a voltage of the common electrode (CE) from the display panel and generate first to kth compensated reference gamma voltages (G_UH, G_UL, G_LH, G_LL) obtained by adjusting voltage values of the first to kth reference gamma voltages based on a comparison result (a difference) between the voltage of the common electrode (Vcom_FB) and the reference common voltage (Vcom_RF).

Each of the data drivers (13_1 to 13_h) is configured to receive the first to kth compensated reference gamma voltages (G_UH, G_UL, G_LH, G_LL) and generate a plurality of grayscale voltages (V0-V255, Y0-Y255) based on the first to kth compensated reference gamma voltages. Each of the data drivers (13_1 to 13_h) is configured to then supply a grayscale voltage corresponding to a brightness level indicated by an input video signal (VS) among the plurality of grayscale voltages to each data line.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display drive device for driving a display panel including a plurality of data lines to which a plurality of display cells are connected and a common electrode commonly connected to the plurality of display cells according to a video signal, the display drive device comprising:

a common voltage generating circuit configured to receive a reference common voltage and apply a voltage obtained by amplifying the reference common voltage to the common electrode as a common voltage;

a reference gamma voltage generating circuit configured to generate first to kth reference gamma voltages corresponding to predetermined gamma characteristics, where k is an integer of 2 or more;

a gamma compensation circuit configured to receive a voltage of the common electrode from the display panel and generate first to kth compensated reference gamma voltages obtained by adjusting voltage values of the first to kth reference gamma voltages based on a comparison result between the received voltage of the common electrode and the reference common voltage; and at least one data driver, each being configured to receive the first to kth compensated reference gamma voltages, generate a plurality of grayscale voltages based on the first to kth compensated reference gamma voltages, and supply a grayscale voltage corresponding to a brightness level indicated by the video signal among the plurality of grayscale voltages to the data lines.

2. The display drive device according to claim 1, wherein the gamma compensation circuit is configured to add a difference between the received voltage of the common electrode and the reference common voltage to each of the first to kth reference gamma voltages to obtain the first to kth compensated reference gamma voltages.

3. The display drive device according to claim 2, wherein the gamma compensation circuit includes first to kth compensation circuits configured to individually receive the first to kth reference gamma voltages and individually generate the first to kth compensated reference gamma voltages, respectively, and each of the first to kth compensation circuits includes:

a first current source configured to generate a first constant current;

a first differential stage configured to pass two currents, into which the first constant current is divided in a ratio of magnitudes of the received voltage of the common electrode and the reference common voltage, respectively to a first node and a second node;

a second current source configured to generate a second constant current;

a second differential stage configured to pass two currents, into which the second constant current is divided in a ratio of magnitudes of the reference gamma voltage and the compensated reference gamma voltage, respectively to the first node and the second node; and an amplifier configured to output a voltage obtained by amplifying a voltage of the second node as the compensated reference gamma voltage.

4. A reference gamma voltage supply device comprising:

a reference gamma voltage generating circuit configured to generate first to kth reference gamma voltages, where k is an integer of 2 or more, corresponding to gamma characteristics of a display panel including a plurality of data lines to which a plurality of display cells are connected and a common electrode commonly connected to the plurality of display cells; and a gamma compensation circuit configured to receive a voltage of the common electrode from the display panel and generate first to kth compensated reference gamma voltages obtained by adjusting voltage values of the first to kth reference gamma voltages based on a comparison result between the received voltage of the common electrode and a predetermined reference common voltage, wherein the gamma compensation circuit is configured to supply the first to kth compensated reference gamma voltages to at least one data driver, each being configured to generate a plurality of grayscale voltages based on the first to kth compensated reference gamma voltages and supply a grayscale voltage corresponding to a brightness level indicated by an input video signal among the plurality of grayscale voltages to the data lines.

5. The reference gamma voltage supply device according to claim 4, wherein the gamma compensation circuit is configured to add a difference between the received voltage of the common electrode and the reference common voltage to each of the first to kth reference gamma voltages to obtain the first to kth compensated reference gamma voltages.

6. The reference gamma voltage supply device according to claim 5, wherein the gamma compensation circuit includes first to kth compensation circuits configured to individually receive the first to kth reference gamma voltages and individually generate the first to kth compensated reference gamma voltages, respectively, and each of the first to kth compensation circuits includes:

a first current source configured to generate a first constant current;

a first differential stage configured to pass two currents, into which the first constant current is divided in a ratio of magnitudes of the received voltage of the common electrode and the reference common voltage, respectively to a first node and a second node;

a second current source configured to generate a second constant current;

a second differential stage configured to pass two currents, into which the second constant current is divided in a ratio of magnitudes of the reference gamma voltage and the compensated reference gamma voltage, respectively to the first node and the second node; and an amplifier configured to output a voltage obtained by amplifying a voltage of the second node as the compensated reference gamma voltage.

7. A display device comprising:

a display panel including a plurality of data lines to which a plurality of display cells are connected and a common electrode commonly connected to the plurality of display cells;

a common voltage generating circuit configured to receive a reference common voltage and apply a voltage obtained by amplifying the reference common voltage to the common electrode as a common voltage;

a reference gamma voltage generating circuit configured to generate first to kth reference gamma voltages corresponding to gamma characteristics of the display panel, where k is an integer of 2 or more;

a gamma compensation circuit configured to receive a voltage of the common electrode from the display panel and generate first to kth compensated reference gamma voltages obtained by adjusting voltage values of the first to kth reference gamma voltages based on a comparison result between the received voltage of the common electrode and the reference common voltage; and at least one data driver, each being configured to receive the first to kth compensated reference gamma voltages, generate a plurality of grayscale voltages based on the first to kth compensated reference gamma voltages, and supply a grayscale voltage corresponding to a brightness level indicated by an input video signal among the plurality of grayscale voltages to the data lines.

8. The display device according to claim 7, wherein the gamma compensation circuit is configured to add a difference between the received voltage of the common electrode and the reference common voltage to each of the first to kth reference gamma voltages to obtain the first to kth compensated reference gamma voltages.

9. The display device according to claim 8, wherein the gamma compensation circuit includes first to kth compensation circuits configured to individually receive the first to kth reference gamma voltages and individually generate the first to kth compensated reference gamma voltages, respectively, and each of the first to kth compensation circuits includes:

a first current source configured to generate a first constant current;

a first differential stage configured to pass two currents, into which the first constant current is divided in a ratio of magnitudes of the received voltage of the common electrode and the reference common voltage, respectively to a first node and a second node;

a second current source configured to generate a second constant current;

a second differential stage configured to pass two currents, into which the second constant current is divided in a ratio of magnitudes of the reference gamma voltage and the compensated reference gamma voltage, respectively to the first node and the second node; and an amplifier configured to output a voltage obtained by amplifying a voltage of the second node as the compensated reference gamma voltage.

* * * * *